Figure 3:
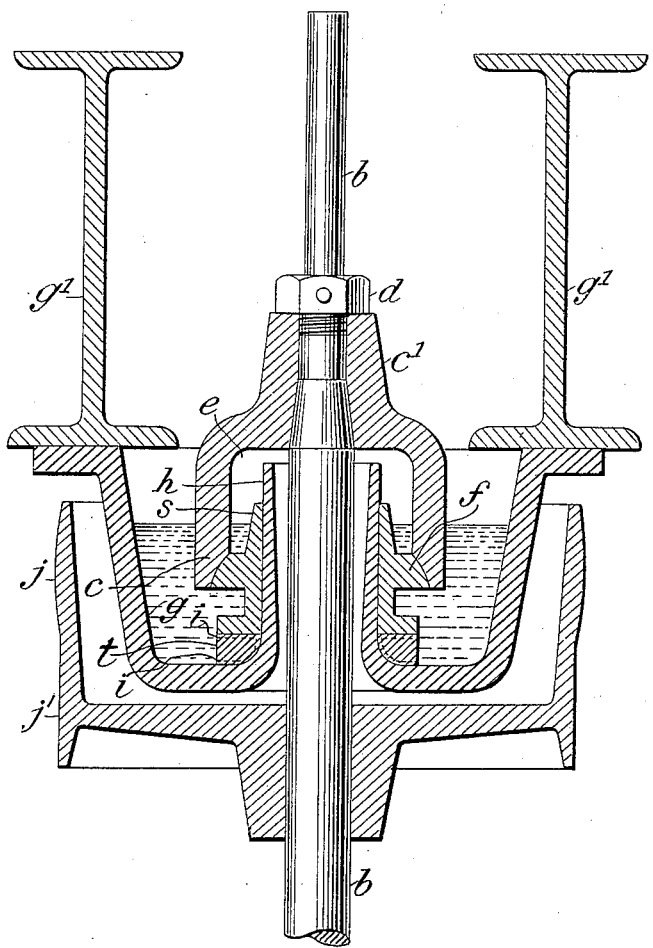

No. 651,375. Patented June 12, 1900.
C. A. MATTHEY.
BEARING FOR CENTRIFUGAL MACHINES.
(Application filed Feb. 1, 1899.)
(No Model.) 2 Sheets—Sheet 1.
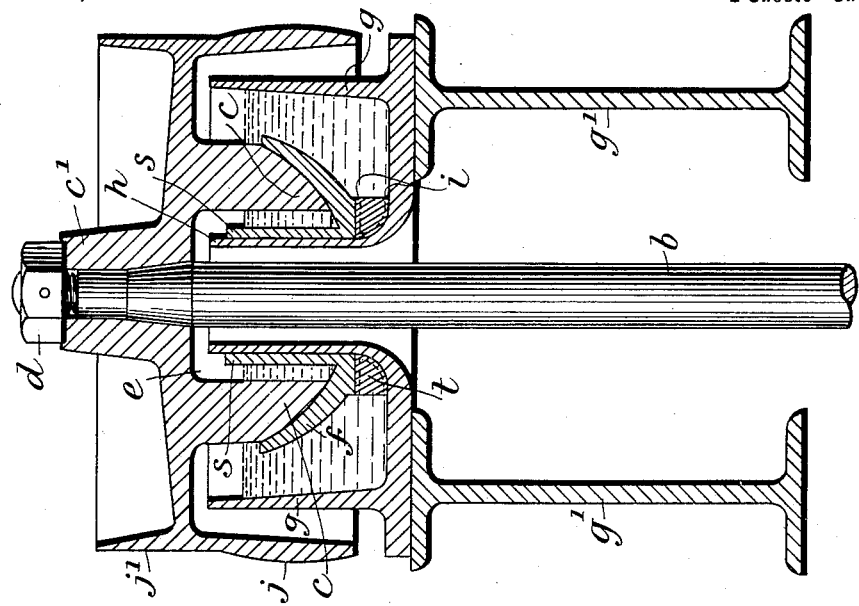
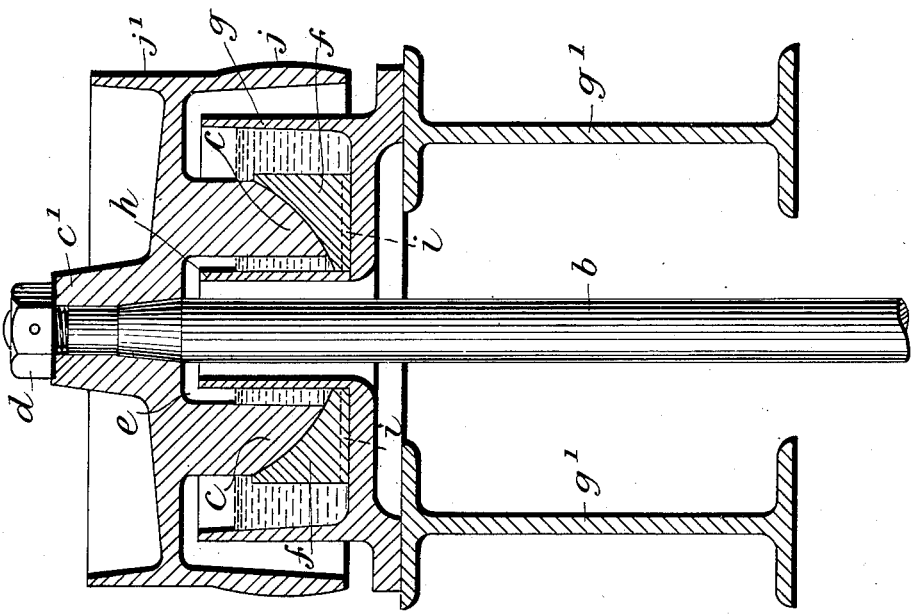
WITNESSES: INVENTOR
Charles Alphonso Matthey,
By his Attorneys:
THE NORRIS PETERS CO., PHOTO-LITHO., WASHINGTON, D. C.

UNITED STATES PATENT OFFICE.

CHARLES ALPHONSO MATTHEY, OF READING, ENGLAND, ASSIGNOR OF ONE-HALF TO THE FAWCETT, PRESTON & COMPANY, LIMITED, OF LIVERPOOL, ENGLAND.

BEARING FOR CENTRIFUGAL MACHINES.

SPECIFICATION forming part of Letters Patent No. 651,375, dated June 12, 1900.

Application filed February 1, 1899. Serial No. 704,208. (No model.)

*To all whom it may concern:*

Be it known that I, CHARLES ALPHONSO MATTHEY, of Reading, county of Berks, England, have invented certain new and useful Improvements in Bearings for Centrifugal Machines, of which the following is a specification.

This invention consists of improvements in bearings for centrifugal machines, and has reference more particularly to machines of the suspended self-balancing type.

The chief feature of the invention is a bearing in the form of a spherical segment on which the spindle is hung, the bearing being drowned in a basin of oil, which preferably is provided with a central pipe surrounding the spindle and retaining the oil.

In the accompanying drawings, Figure 1 is a central vertical section of the preferred form of my improved bearing, oil-basin, driving-pulley, and adjacent parts. Fig. 2 is a similar view to Fig. 1 and illustrates a modification. Fig. 3 is also a similar view to Fig. 1 and illustrates another modification.

Referring first to Figs. 1 and 2, $b$ is a solid spindle, on which a basket may be mounted. $c$ is a bearing in the form of a spherical segment attached to the spindle $b$ and from which the basket hangs, the upper end of said spindle being fitted with a nut $d$, which bears upon the part $c'$, which is integral with said bearing. $e$ is a central cylindrical hollow in said bearing. $f$ is a female or hollow spherical segment resting at the bottom of a basin $g$ for containing oil. This basin is supported by the beams $g'\ g'$. $h$ is a vertical central pipe (which is preferably cast with the basin $g$, as shown) projecting up from the bottom of said basin into the cylindrical hollow $e$ of the bearing $c$ up to the level of the upper edge of the basin $g$. The rubbing surfaces of the bearing $c$ and spherical segment $f$ are thus drowned in oil. $i\ i$ are oilways formed in the under face of the spherical segment $f$, so as to allow of passage of oil to replace at the center any oil that may be pumped outward by the rotary action of the rubbing surfaces. These oilways are, however, not essential and may be dispensed with. The spherical segment $f$ may either be a fixture to the basin $g$ or be free to rotate with the upper spherical segment $c$, in which latter case the friction of rotation takes place between the flat under side of the segment $f$ and the bottom of the basin $g$, the spherical surfaces merely providing for the oscillation. In both cases the rubbing surfaces are bathed in oil. $j\ j'$ designate a belt-pulley, preferably integral with the bearing $c$. The lower part $j$ receives the driving-belt and surrounds the oil-basin $g$ without touching it and is at substantially the same level as the spherical support, so that the pull of the belt will not tend to tilt the spindle $b$. The upper part $j'$ of the pulley is intended to be acted upon by the brake. The spindle $b$ passes through the central pipe $h$, and sufficient space is left between them and also between said pipe and the spherical segment $c$ to allow of some oscillation of the spindle.

Referring now to the modification shown in Fig. 2, the segment $f$ is free to revolve and is formed with a sleeve $s$, fitting around the central pipe $h$ to take the wear caused by the pull of the belt. $t$ is a washer either fixed or free to revolve (or there may be more than one such washer) between the bottom of the basin $g$ and the under side of the segment $f$. $i\ i$ are oilways in the upper and lower faces of the washer $t$. If desired, antifriction-balls rolling in a circular path or paths in the manner well understood may be employed between the washer $t$ and the under side of the segment $f$.

In the modification illustrated in Fig. 3 the upper spherical segment $c$ is the female segment of the bearing and the lower segment $f$ is the male segment. The basin $g$ is shown as hung from the under side of the beams $g'\ g'$ instead of resting upon them, as in the drawings. The bearing $c$ is not integral with the pulley $j\ j'$, as in Figs. 1 and 2, but is necessarily a separate piece.

What I claim is—

1. In centrifugal and other machines having a revolving spindle, the combination with said spindle, of a bearing consisting of an upper convex segment of a sphere suspending and revolving with said spindle, and a lower concave segment of a sphere, said segments having reciprocal annular bearing-faces and having a common axis at a point above such faces, whereby the concavity in the lower segment tends to retain oil between the bearing-faces, and an oil-basin surrounding said bearing and adapted to contain oil to immerse the spherical bearing-faces, substantially as set forth.

2. In centrifugal and other machines having a revolving spindle, the combination with said spindle, of the spherical bearing $c$ having a central cylindrical hollow $e$, and fixed to, suspending, and revolving with, said spindle, the support $f$, and the oil-basin $g$, having a central vertical pipe $h$ rising between said spindle and the support to above the bearing-faces of said bearing and support for preventing escape of oil around the shaft, substantially as and for the purpose set forth.

3. In centrifugal and other machines, a revolving spindle, and a bearing therefor consisting of annular bearing-surfaces, the one fixed to the spindle, in combination with an oil-basin for said bearing having an annular oil-chamber enveloping said bearing-faces and having walls rising above the latter at the inner and outer sides thereof and surrounding said spindle, said vessel having a passage-way communicating between the inner and outer sides of said bearing-faces for permitting inflow of oil past said faces, whereby the oil thrown to the outer part of said chamber by centrifugal action can flow through said passage-way to the inner side of said bearing-faces for restoring the oil-level in said basin, and a continuous flow of oil across said faces can take place.

4. In centrifugal and other machines having a revolving spindle, the combination with said spindle of a bearing, consisting of two reciprocal segments of a sphere having annular bearing-faces, the one segment supporting said spindle, and the other segment supporting that supporting said spindle, and an oil-basin surrounding said bearing, and adapted to contain oil to immerse said bearing-faces and having walls independent of said spindle rising at their inner and outer sides, substantially as set forth.

5. In centrifugal and other machines having a revolving spindle, the combination with said spindle, of a bearing consisting of two reciprocal segments of a sphere, the one supporting and free to revolve with said spindle, and the other supporting that supporting said spindle and free to revolve with the first, and an oil-basin surrounding said bearing and adapted to contain oil to immerse the bearing-faces of said segments and revolubly supporting the latter of them, substantially as set forth.

6. In centrifugal and other machines having a revolving spindle, the combination with said spindle, of a bearing consisting of two reciprocal segments of a sphere, one supporting and revolving with said spindle, and the other supporting that supporting said spindle, an annular washer supporting the latter segment, and an oil-basin supporting said washer and containing oil to immerse said washer.

7. In centrifugal and other machines, a revolving spindle, and a bearing therefor consisting of annular bearing-surfaces, the one fixed to the spindle, in combination with an oil-basin for said bearing having an oil-chamber enveloping said bearing-faces and having walls rising above the latter at their inner and outer sides, and independent of said spindle, for immersing them in oil, and means communicating between the inner and outer sides of said bearing-faces for permitting inflow of oil past said faces, whereby the oil thrown to the outer part of said chamber by centrifugal action can flow through said communicating means to the inner side of said bearing-faces for restoring the oil-level in said basin, and a continuous flow of oil across said faces can take place.

In witness whereof I have hereunto signed my name in the presence of two subscribing witnesses.

CHARLES ALPHONSO MATTHEY.

Witnesses:
SAMUEL M. TAYLOR,
R. J. MILLIGAN.